US012266860B2

(12) United States Patent
Somersalo

(10) Patent No.: US 12,266,860 B2
(45) Date of Patent: Apr. 1, 2025

(54) ANTENNA ELEMENT AND AN ANTENNA ARRAY FOR WIRELESS COMMUNICATION SYSTEMS

(71) Applicant: Teknologian tutkimuskeskus VTT Oy, Espoo (FI)

(72) Inventor: Matti Somersalo, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 492 days.

(21) Appl. No.: 17/605,028

(22) PCT Filed: May 5, 2020

(86) PCT No.: PCT/FI2020/050303
§ 371 (c)(1),
(2) Date: Oct. 20, 2021

(87) PCT Pub. No.: WO2020/225482
PCT Pub. Date: Nov. 12, 2020

(65) Prior Publication Data

US 2022/0209421 A1 Jun. 30, 2022

(30) Foreign Application Priority Data

May 7, 2019 (FI) .................................... 20195376

(51) Int. Cl.

| | |
|---|---|
| ***H01Q 21/06*** | (2006.01) |
| ***H01Q 1/24*** | (2006.01) |
| ***H01Q 1/38*** | (2006.01) |

(52) U.S. Cl.
CPC ............. *H01Q 21/062* (2013.01); *H01Q 1/38* (2013.01); *H01Q 1/241* (2013.01)

(58) Field of Classification Search
CPC ............ H01Q 5/40; H01Q 5/48; H01Q 9/065; H01Q 21/0087; H01Q 21/061; H01Q 21/062; H01Q 1/028; H01Q 1/085; H01Q 1/241; H01Q 1/246
See application file for complete search history.

(56) References Cited

U.S. PATENT DOCUMENTS 5,966,097 A * 10/1999 Fukasawa ............ H01Q 19/005 343/702
6,166,694 A * 12/2000 Ying .................... H01Q 9/0421 343/702
2001/0007445 A1* 7/2001 Pankinaho ............. H01Q 21/30 343/848

(Continued)

FOREIGN PATENT DOCUMENTS

CA 2414124 A1 6/2004
CN 1788385 A 6/2006

(Continued)

*Primary Examiner* — Jason M Crawford
(74) *Attorney, Agent, or Firm* — Laine IP Oy

(57) ABSTRACT

According to an example aspect of the present invention, there is provided an antenna element for an antenna array, comprising, a transmission line and an antenna, wherein one end of the transmission line is coupled to a base board of the antenna array and another end of the transmission line is coupled to the antenna, and a first part of the transmission line is bent about 90 degrees compared to a second part of the transmission line, and the transmission line and the antenna are on, or in, a single flexible film.

17 Claims, 4 Drawing Sheets

(56) References Cited

U.S. PATENT DOCUMENTS

| | | | | |
|---|---|---|---|---|
| 2002/0019247 | A1* | 2/2002 | Egorov | H01Q 5/371<br>455/557 |
| 2004/0196190 | A1 | 10/2004 | Mendolia et al. | |
| 2005/0062649 | A1* | 3/2005 | Chiang | H01Q 3/20<br>343/700 MS |
| 2006/0017620 | A1* | 1/2006 | Chen | H01Q 9/40<br>343/700 MS |
| 2006/0170597 | A1* | 8/2006 | Kurashima | H01Q 1/242<br>343/795 |
| 2007/0069970 | A1* | 3/2007 | Argaman | H01Q 15/168<br>343/912 |
| 2008/0316117 | A1 | 12/2008 | Hill et al. | |
| 2011/0095945 | A1 | 4/2011 | Gianvittorio | |
| 2011/0260939 | A1 | 10/2011 | Korva et al. | |
| 2012/0013514 | A1 | 1/2012 | Yang et al. | |
| 2014/0266973 | A1 | 9/2014 | Devries et al. | |
| 2019/0288382 | A1* | 9/2019 | Kamgaing | H01L 23/522 |
| 2020/0058606 | A1* | 2/2020 | Tsai | H01L 23/481 |
| 2020/0106195 | A1* | 4/2020 | Fleancu | H01Q 9/20 |
| 2021/0305717 | A1* | 9/2021 | Hou | H04B 7/0413 |
| 2021/0344122 | A1* | 11/2021 | Kaistha | H01Q 19/108 |
| 2022/0029298 | A1* | 1/2022 | Huang | H01Q 9/42 |
| 2022/0166145 | A1* | 5/2022 | Zaid | H01Q 21/28 |
| 2022/0209421 | A1* | 6/2022 | Somersalo | H01Q 1/246 |
| 2023/0223364 | A1* | 7/2023 | Tsai | H01Q 1/2283<br>343/727 |
| 2024/0088566 | A1* | 3/2024 | Somersalo | H01Q 1/50 |
| 2024/0113451 | A1* | 4/2024 | Neenan | H01Q 9/42 |

FOREIGN PATENT DOCUMENTS

| | | | |
|---|---|---|---|
| CN | 105244613 | A | 1/2016 |
| DE | 202017003830 | U1 | 11/2017 |
| EP | 2779307 | A1 | 9/2014 |
| KR | 20130134793 | A | 12/2013 |
| SE | 522829 | C2 | 3/2004 |
| WO | WO WO2004066444 | A1 | 8/2004 |
| WO | WO WO2011031499 | A2 | 3/2011 |

* cited by examiner

ANTENNA ELEMENT AND AN ANTENNA ARRAY FOR WIRELESS COMMUNICATION SYSTEMS

FIELD

Embodiments of the present invention relate in general to an antenna element and an antenna array for wireless communication systems.

BACKGROUND

Performance of wireless communication systems may be enhanced by exploiting antenna arrays for transmission and/or reception over a radio channel. If antenna arrays are used for both, transmission and reception, the system may be referred to as a Multiple-Input Multiple-Output, MIMO, system. As the demand for wireless communication increases, the use of MIMO is becoming even more important than before. For example, 3rd Generation Partnership Project, 3GPP, develops 5G technology, which may be referred to as New Radio, NR, radio access technology as well, and considers the use of MIMO for that. Similar enhancements may also be employed in other cellular networks and in several other wireless communication networks as well, such as, for example, in Wireless Local Area Networks, WLANs. Therefore it is expected that the use of MIMO increases in the future. However, current antenna arrays are heavy and expensive to manufacture. There is therefore a need to provide light-weight antenna arrays that are cheap to manufacture.

SUMMARY OF THE INVENTION

According to some aspects, there is provided the subject-matter of the independent claims. Some embodiments are defined in the dependent claims.

According to a first aspect of the present invention, there is provided an antenna element for an antenna array, comprising, a transmission line and an antenna, wherein one end of the transmission line is coupled to a base board of the antenna array and another end of the transmission line is coupled to the antenna, and a first part of the transmission line is bent about 90 degrees compared to a second part of the transmission line, and the transmission line and the antenna are on, or in, a single flexible film.

According to the first aspect of the present invention, the antenna element may further comprise at least a part of a support element between the base board of the antenna array and the antenna, wherein the transmission line may be bent along a side of the part of the support element.

According to the first aspect of the present invention, said single flexible film may be made of plastic.

According to the first aspect of the present invention, said single flexible film may comprise an opening and the transmission line is arranged to go through the opening.

According to the first aspect of the present invention, said single flexible film may be made of Polyethylene terephthalate, PET, material.

According to the first aspect of the present invention, a thickness of the single flexible film may be about 50 micrometers or less, such as 25 micrometers.

According to the first aspect of the present invention, the antenna may be a dipole antenna.

According to the first aspect of the present invention, the antenna and the base board may be at a distance from each other, the distance preferably being comparable to a quarter of a wavelength.

According to the first aspect of the present invention, the transmission line may comprise copper or silver paste.

According to the first aspect of the present invention, the antenna element may further comprise a parasitic element in parallel with the antenna.

According to a second aspect of the present invention, an antenna array may comprise multiple antenna elements according to the first aspect.

According to a third aspect of the present invention, a wireless network node may comprise the antenna array according to second aspect. In some embodiments, the wireless network node may be a base station configured to operate in accordance with a 3rd Generation Partnership Project, 3GPP, standard. Moreover, the 3GPP standard may be a 5G standard.

EMBODIMENTS

Figure 1:
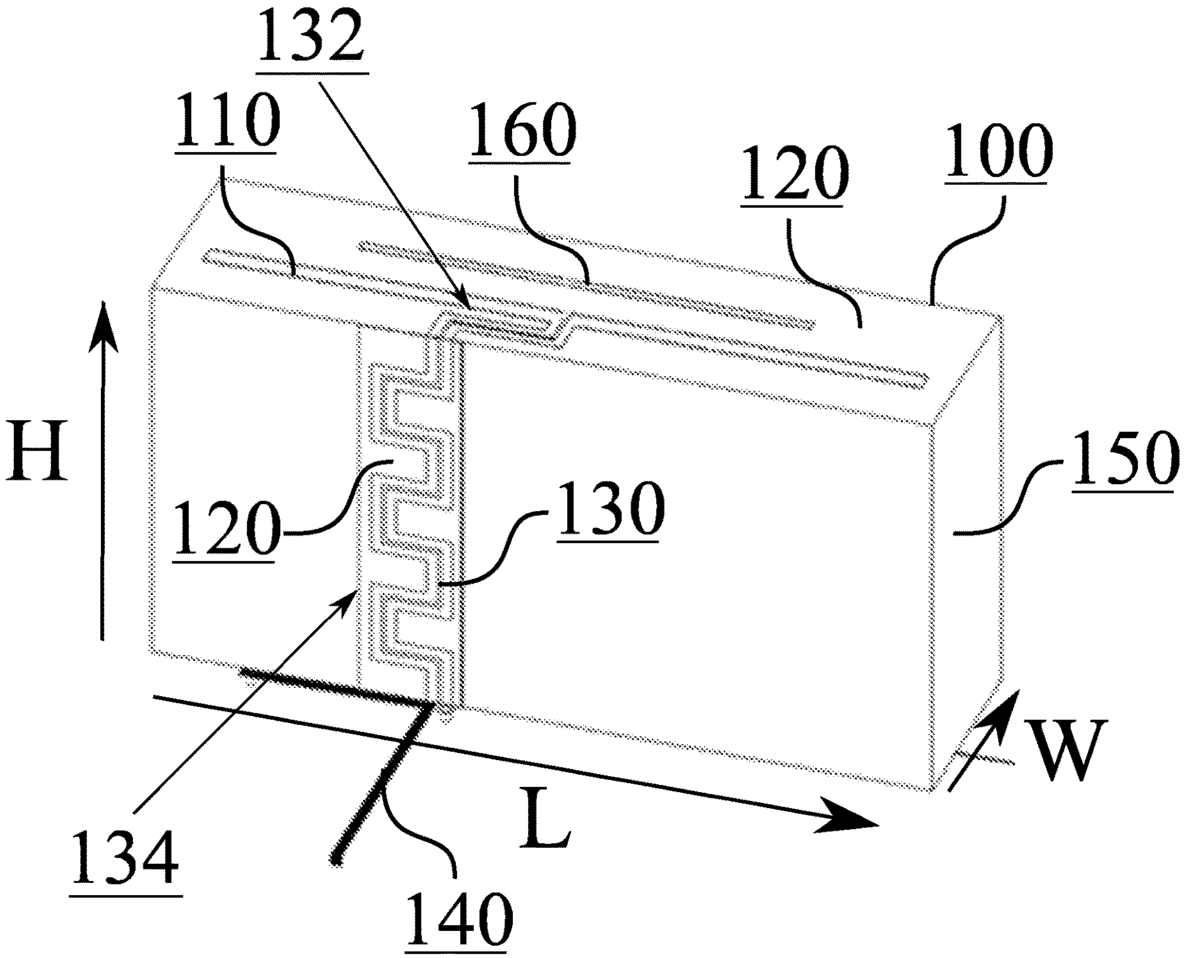
FIG. 1 illustrates an exemplary antenna element in accordance with at least some embodiments of the present invention.

Some embodiments of the present invention relate to an antenna element for an antenna array. More specifically, a transmission line and an antenna of the antenna element may be on, or in, a single flexible film, such as a 50 or 25 micrometers thick Polyethylene terephthalate, PET, material. The transmission line, and possibly a part of the antenna, may be bent down 90 degrees towards a base board of the antenna array and coupled to the base board. Thus, one end of the transmission line may be coupled to the antenna, such as a dipole antenna or a crossed dipole, while another end of the transmission line may be coupled to the base board of the antenna array, thereby enabling the operation of the antenna element. At the same time, the antenna element and the antenna array may be light-weight and cheap to manufacture due to the use of the single flexible film.

According to some embodiments of the present invention, said one end of the transmission line may be coupled to the antenna using a solid connection, such as a galvanic connection. Similarly, said another end of the transmission line may be coupled to the base board of the antenna array using a solid connection. For instance, said another end of the transmission line may be coupled to a feed line on the base board. So according to at least some embodiments of the present invention, coupling may not be capacitive or inductive.

Embodiments of the present invention may be exploited in various wireless communication networks, such as in the context of 5G, i.e., New Radio, NR, networks and for future cellular networks as well. Embodiments of the invention are not limited to cellular networks though, and can be exploited in any wireless system.

For instance, a wireless communication network may comprise one or more wireless terminals, base stations, relay nodes and/or core network elements. A wireless terminal may be connected to a base station and/or relay node via air interface. Then, an antenna element and/or an antenna array may be used for performing wireless communications over the air interface using a Radio Access Technology, RAT. In case of cellular networks, the RAT may be for example Long Term Evolution, LTE, New Radio, NR, or MulteFire. In case of non-cellular networks, the RAT may be for example Wireless Local Area Network, WLAN.

Using NR as an example of a cellular RAT, a base station may be referred to as gNB and a wireless terminal may be referred to as a User Equipment, UE. In case of WLAN, a base station may be referred to as an access point. Generally speaking, a base station, a relay node and an access point may be referred to as wireless network nodes. In any case, embodiments of the present invention are not restricted to any particular wireless technology. Instead, embodiments of the present invention may be exploited in any wireless communication network, wherein an antenna element and/or an antenna array is used for wireless communications.

It is expected that the utilization of antenna arrays increase in various wireless communication systems. For example, massive Multiple-Input Multiple-Output, MIMO, systems may be used in 5G/NR BSs. Thus, antenna elements of the antenna arrays should be cheap to manufacture and preferably light-weight as well. Embodiments of the present invention therefore provide an antenna element for an antenna array, wherein an antenna and a transmission line of an antenna element may be manufactured on a single flexible film. The single flexible film may be thin. For instance, the single flexible film may be made of PET material. In embodiments of the present invention, thickness of the single flexible film is not crucial, but to guarantee flexibility thickness of the single flexible film may be 50 micrometers or less. For instance, thickness of 25 micrometers may be used too or any other thickness which is good for bending the transmission lines 90 degrees. The material of the single flexible film may be of any low loss RF-material, such as polyimide, yet PET film is cheap. The support material may slightly affect antenna characteristics and should be taken into account in antenna design.

An antenna element may comprise the transmission line for connecting the antenna, such as a dipole antenna, to a base board of an antenna array. In some embodiments, the transmission line may be made deploying copper etching or roll-to-roll printing of silver paste. That is to say, the transmission line may be made of copper or silver.

In some embodiments of the present invention, the transmission line may be separated partly from the single flexible film, e.g., by using a stamping tool, and then bent down 90 degrees. Thus, the transmission line may be coupled, or connected, to the antenna from one end and to the base board of the antenna array from the other end.

In some embodiments of the present invention, pair line impedance may be about 150 ohms, with a 0.2 mm gap between the base board of the antenna array and the antenna. In some embodiments, a length of the transmission line may be adjusted using a meandering line. When the length of the transmission line is 180 degrees, the antenna input impedance is back to original. Length of the transmission line is a design issue and may be chosen so that impedance matching is easy on the base board of the antenna array.

In some embodiments of the present invention, an antenna element or antenna array may need a support element between the base board of the antenna array and one or more antennas. The support element, or a part of it, may be manufactured using a 3D printer. Alternatively, the support element, or a part of it, may be shaped of light weighted bulk material (relative dielectric constant close to 1) such as Rohacell®.

Concerning antenna elements, FIG. 1 illustrates an exemplary antenna element in accordance with at least some embodiments of the present invention. The antenna element 100 may be for an antenna array (not shown in FIG. 1). In some embodiments, the exemplary single antenna element 100 is linearly polarized. The exemplary antenna element 100 of FIG. 1 may comprise an antenna 110, such as a dipole antenna, on a single flexible film 120. The antenna 110 may be above ground and above a base board of an antenna array.

The single flexible film 120 may be a plastic film, such as a PET film. In some embodiments, thickness of the single flexible film 120 may be typically 50 micrometers or less, such as 25 micrometers. The exemplary antenna element 100 of FIG. 1 may also comprise a transmission line 130, such as a meandering line, on, or in, the single flexible film 120. The transmission line 130 may comprise a first part 132 and a second part 134. Thus, in some embodiments, the first part 132 may be on, or in, the single flexible film and the second part 134 may be on, or in, the single flexible film.

In addition, in some embodiments, the exemplary antenna element 100 of FIG. 1 may comprise a feed with or without matching element(s) 140 and/or a support element 150, or at least a part of the support element 150. In some embodiments, the exemplary antenna 100 element of FIG. 1 may also comprise parasitic element 160, for example in case of double band antennas or enhanced single band bandwidth. On the other hand, parasitic element 160 may not be beneficial when targeted bandwidth of single band antennas can be obtained without this element, i.e., in case of single band antenna antennas the exemplary antenna element 100 may, or may not, comprise parasitic element 160. Parasitic element 160 may for example add resonance on a higher band. Thus, parasitic element 160 is optional.

In some embodiments of the present invention, one end of the transmission line 130, such as the end associated with the second part 134 of the transmission line 130, may be coupled or connected to a base board (not shown in FIG. 1) of the antenna array. Another end of the transmission line, such as the end associated with the first part 132 of the transmission line 130, may be coupled or connected to the antenna 110. As shown in FIG. 1, the first part 132 of the transmission line 130 may be bent about 90 degrees compared to the second part 134 of the transmission line.

In some embodiments, the support element 150, or at least a part of the support element 150, may be between the base board of the antenna array and the antenna 110. In such a case, the transmission line 130 may be bent along a side of the support element 150, or a part of the support element 150. That is to say, the transmission line 130 may be bent over an edge of the support element 150, or a part of the support element 150.

In FIG. 1, H denotes height of the exemplary antenna element 100, L denotes length of the exemplary antenna element 100 and W denotes width of the exemplary antenna element 100. As dimensions of an antenna depend on operation frequency, the dimensions may be defined using electrical dimensions, i.e., with respect to wavelengths. For instance, for a dipole antenna element on a reflective base, L may be close to a half of a wavelength and H may be close to a quarter of the wavelength at a centre frequency, for optimal bandwidth and radiation efficiency (e.g. at 3.5 GHz, L~40 mm and H~20 mm). Minimum W is determined by antenna (dipole) width and the possible parasitic element. Said distance may be referred to as a gap as well. In some embodiments, the gap may be filled with the support element 150.

Figure 2A:
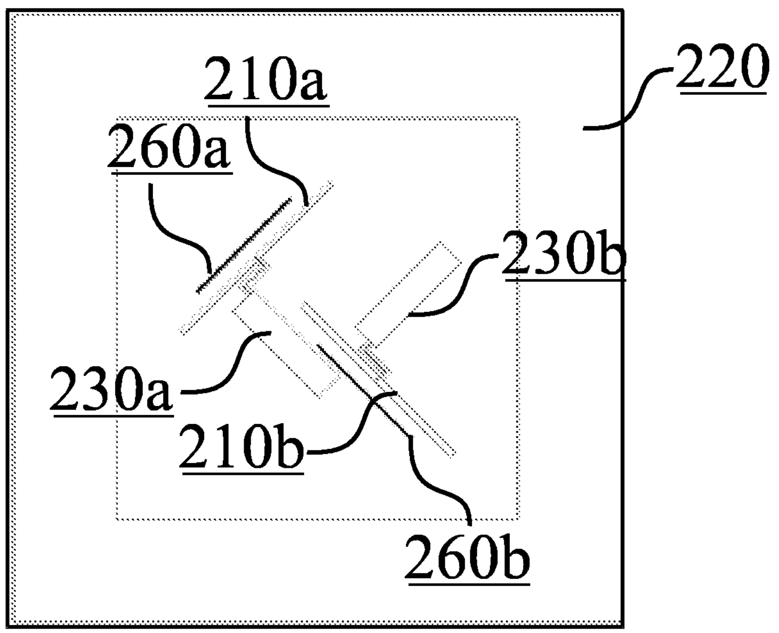
FIG. 2A illustrates a first example of two antenna elements in accordance with at least some embodiments of the present invention.
Figure 2B:
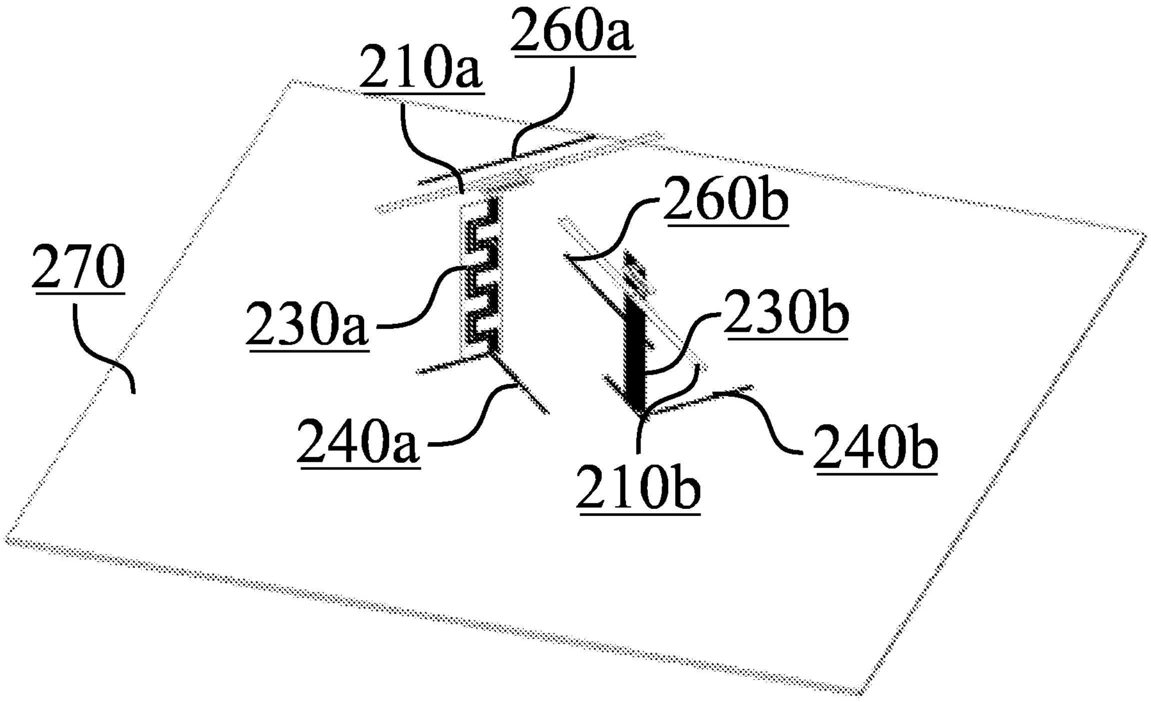
FIG. 2B illustrates a second example of two antenna elements in accordance with at least some embodiments of the present invention.

FIGS. 2A and 2B, illustrate a first and a second example of two antenna elements in accordance with at least some embodiments of the present invention, respectively. In FIGS. 2A and 2B, a first antenna is denoted by 210*a* and a second antenna is denoted by 210*b* while a first transmission line, connected or coupled to the first antenna 210*a*, is denoted by 230*a* and a second transmission line, connected or coupled to the second antenna 210*b*, is denoted by 230*b*. The first antenna 210*a* and the second antenna 210*b* may correspond to the antenna 210 of FIG. 3 and the first transmission line 230*a* and the second transmission line 230*b* may correspond to the transmission line 130 of FIG. 1. In addition, in FIG. 2B a first feed 240*a* and a second feed 240*b* are shown. The first feed 240*a* and the second feed 240*b* may correspond to the feed 140 of FIG. 1.

In FIGS. 2A and 2B, a first parasitic element is denoted by 260*a* and a second parasitic element is denoted by 260*b*. The first parasitic element 260*a* and the second parasitic element 260*b* may correspond to the parasitic element 160 of FIG. 1. Similarly as in case of the exemplary antenna element of FIG. 1, the first parasitic element 260*a* and the second parasitic element 260*b* are optional, e.g., may be used in case of bandwidth enhancement or double band antennas.

As shown in FIG. 2A, the first antenna 210*a*, the second antenna 210*b*, the first transmission line 230*a* and the second transmission line 230*b* may be on a single flexible film 220. The single flexible film 220 may correspond to the single flexible film 120 of FIG. 1. FIG. 2A depicts an example, wherein the transmission lines 230*a* and 230*b* may not be bent yet.

FIG. 2B depicts an example, wherein a first part of the first transmission line 230*a* may be bent about 90 degrees compared to a second part of the first transmission line 230*a*. Similarly, a first part of the second transmission line 230*a* may be bent about 90 degrees compared to a second part of the second transmission line 230*a*. Therefore, the first transmission line 230*a* and the second transmission line 230*b* may be connected or coupled to the base board 270 of the antenna array after bending.

Final matching may be done at the base board 270 of the antenna array or in some cases directly attached to the transmission lines on the flexible film. Matching may be done using discrete components, such as inductors and capacitors, or distributed components, such as transmission lines, or as a combination of both. For instance, in some embodiments of the present invention, matching may be done using a single microstrip line stub printed (etched) perpendicular to the feed lines 140, 240 and 240*b*. Also, the feed line itself may be a part of a matching circuit. Embodiments of the present invention therefore enable simple and cost-effective manufacturing.

Figure 3A:
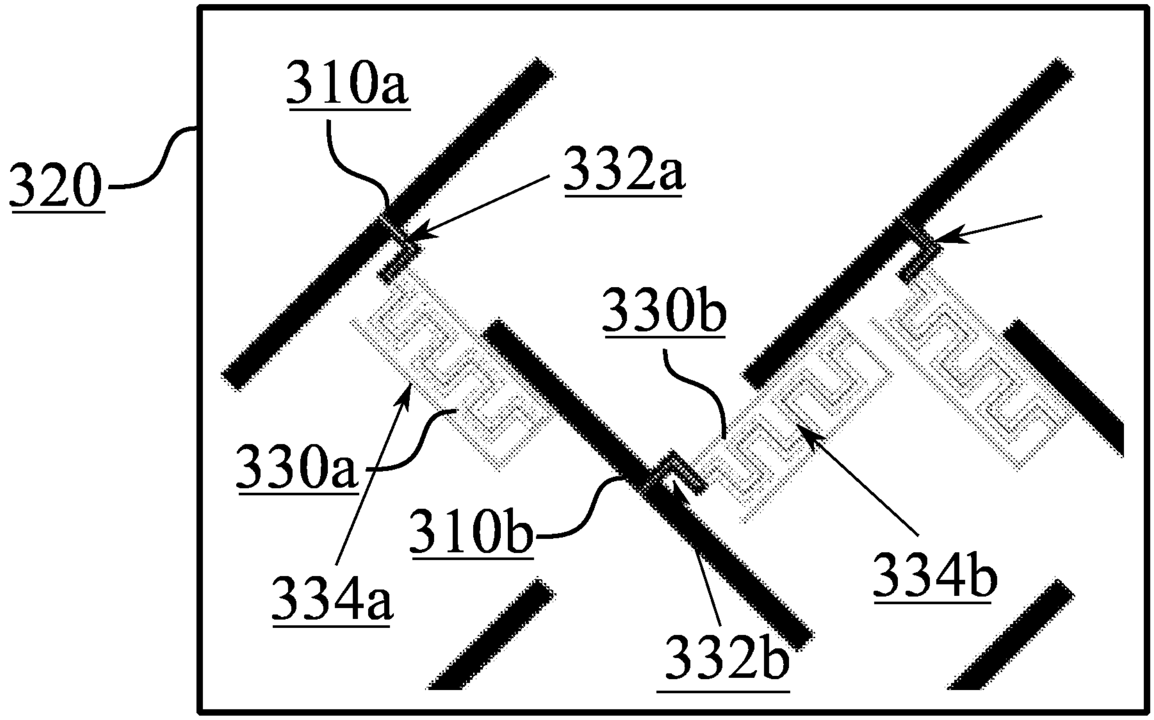
FIG. 3A illustrates a third example of two antenna elements in accordance with at least some embodiments of the present invention.
Figure 3B:
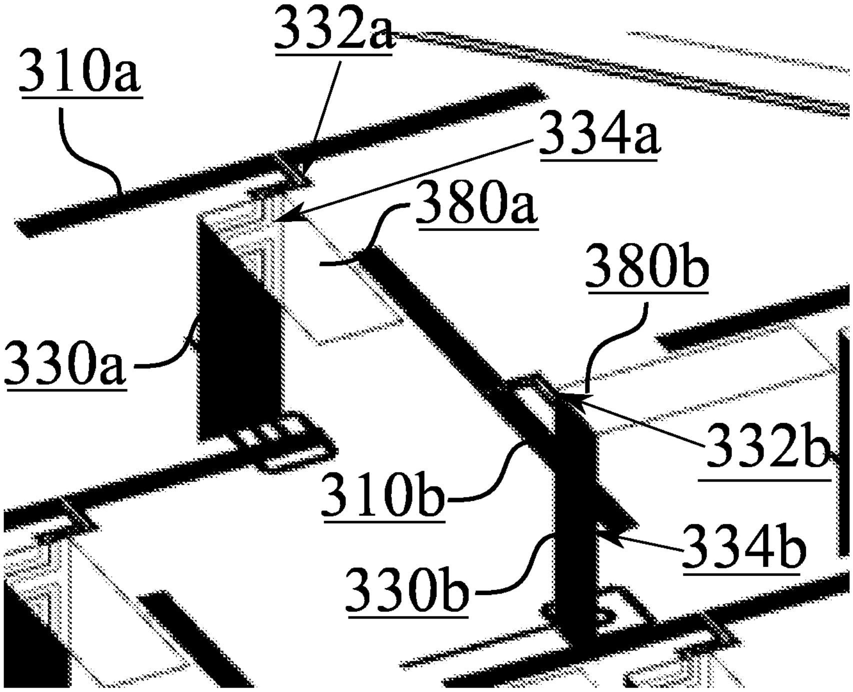
FIG. 3B illustrates a fourth example of two antenna elements in accordance with at least some embodiments of the present invention.

FIGS. 3A and 3B, illustrate a third example and a fourth example of two antenna elements, respectively, in accordance with at least some embodiments of the present invention. The example of FIG. 3A may be referred to as an example of a stamped antenna film, or sheet, and the example of FIG. 3B may be referred to as an example of a bent antenna film, or sheet.

Similarly as in FIGS. 2A and 2B, in FIGS. 3A and 3B a first antenna is denoted by 310*a* and a second antenna is denoted by 310*b* while a first transmission line, connected or coupled to the first antenna 310*a*, is denoted by 330*a* and a second transmission line, connected or coupled to the second antenna 310*b*, is denoted by 33*b*. The first antenna 310*a* and the second antenna 310*b* may correspond to the antenna 110 of FIG. 1 and the first transmission line 330*a* and the second transmission line 330*b* may correspond to the transmission line 130 of FIG. 1. In FIG. 3A a single flexible film 320 is also shown and the single flexible film may correspond to the single flexible film 120 of FIG. 1. In addition, in FIG. 3B a first opening 380*a* and a second opening 380*b* on a single flexible sheet are shown.

FIG. 3A illustrates the first dipole antenna 310*a*, the second dipole antenna 310*b*, the first transmission line 330*a* and the second transmission line 330*b* on the single flexible film 320, i.e., sheet. The single flexible film 320 may be referred to as a stamped antenna sheet.

Then, FIG. 3B illustrates the first antenna 310*a*, the second antenna 310*b*, the first transmission line 330*a* and the second transmission line 330*b* on the single flexible film 320, i.e., sheet, when a first part 332*a* of the first transmission line 330*a* is bent 90 degrees compared to a second part 334*a* of the first transmission line 330*b*. Also, a first part 332*b* of the second transmission line 330*b* is bent 90 degrees compared to a second part 334*b* of the second transmission line 330*b*. As shown in the example of FIG. 3B, the single flexible film 310*b* may be bent and the first transmission line 330*a* is arranged to go through the first opening 380*a* while the second transmission line 330*b* is arranged to go through the second opening 380*b*.

That is to say, for example the first part 332*a* of the first transmission line 330*a* may be at the same level with the second part 334*a* of the first transmission line 330*a* before bending, i.e., as shown in the example of FIG. 3A. Also, the first transmission line 330*a* may be at the same level with the antenna 310*a* before bending. However, after bending the first part of the first transmission line 330*a* may be perpendicular to the second part of the first transmission line 330*a* and to the antenna 310*a*, as shown in FIG. 3B.

Figure 4A:
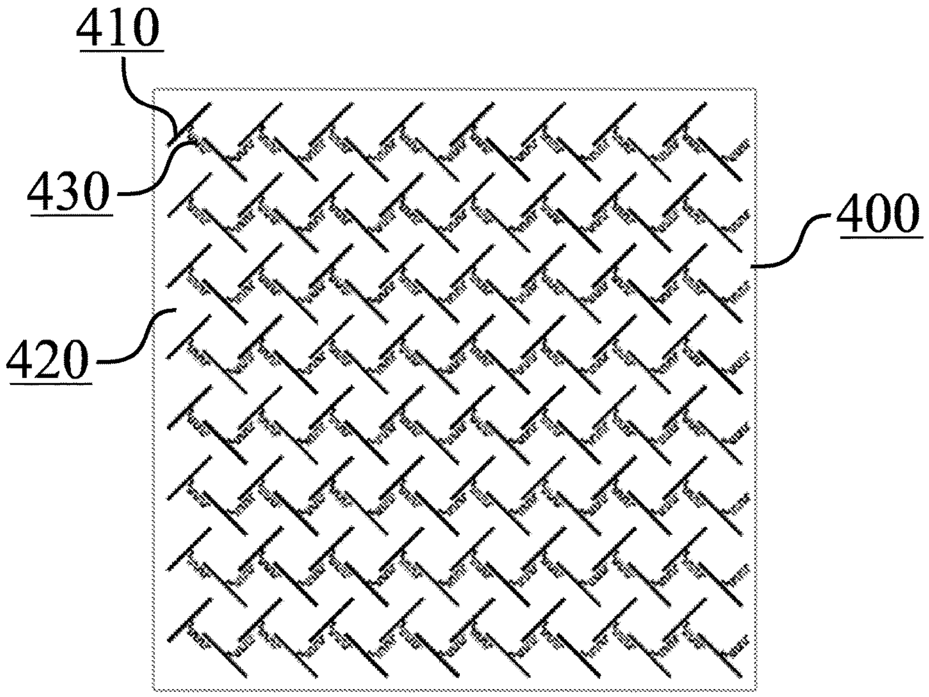
FIG. 4A illustrates a first example of an antenna array comprising 8*8 antenna elements in accordance with at least some embodiments of the present invention.
Figure 4B:
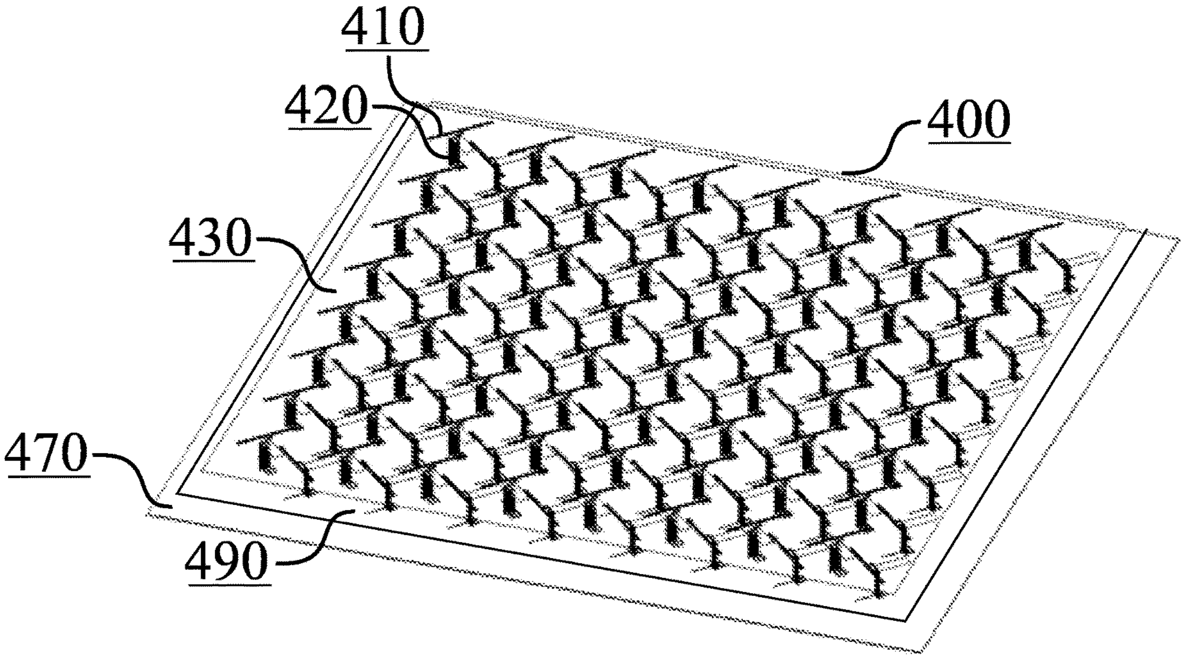
FIG. 4B illustrates a second example of an antenna array comprising 8*8 antenna elements in accordance with at least some embodiments of the present invention.

FIGS. 4A and 4B illustrate a first and a second example of an antenna array comprising 8*8 antenna elements, respectively, in accordance with at least some embodiments of the present invention. Embodiments of the present invention may be in general exploited for antenna arrays comprising any number of antenna elements though. For instance, embodiments of the present invention may be exploited for antenna arrays comprising 128 antenna elements, e.g., for sub 6 GHz frequency bands, such as for single band 3.2-3.8 GHz and double band 3.3-5.0 GHz.

In FIGS. 4A and 4B, the antenna array is denoted by 400, an antenna is denoted by 410, a single flexible film is denoted by 420 and a transmission line is denoted by 430. The antenna 410, the single flexible film 420 and the transmission line 430 may correspond to the antenna 110, the single flexible film 120 and the transmission line 130 of FIG. 1. In FIG. 4B a base board 470 is shown and the base board 470 may correspond to the base board 270 of FIG. 2. In FIG. 4B a spacer 490 is shown as well. The spacer 490 may be referred to as a support element in some embodiments. Moreover, the spacer 490 may be between the base board 470 and one or more antennas 410. In some embodiments, the spacer 490 may be needed to keep the single film 420, i.e., an antenna film in form. The spacer 490 may be printed with a 3D printer.

Embodiments of the present invention therefore provide an antenna element for an antenna array, wherein the antenna element may be made of cheap and light-weight material. Moreover, embodiments of the present invention provide an antenna element and an antenna array which are suitable for mass production. For example, conventional etching process may be exploited on a single flexible film if the single flexible film is copper plated. On the other hand, roll-to-roll silver plate printing may be exploited as well, if some metal losses can be tolerated.

Even though the essence of the present invention is in structural lightness, cheapness in production and suitability for mass production, one additional aspect is that the transmission line connecting the antenna element with a base board may be printed/etched as a pair line on the same side of the flexible sheet, i.e., film, as the antenna. Moreover, as the antenna-transmission-line pattern may be only at one side of the flexible sheet, no alignment of print is needed as in two- or multi-layer structures. The impedance level of such a transmission line may be high (~150 ohms), instead of more convenient ~50 ohms, but when the transmission line is half wavelength long, the antenna input impedance is close to the original. As distance L is about a quarter of the wavelength, the missing quarter may be accomplished by line meandering. Further, the line length may be tuned to make the rest of the antenna tuning on the base board, for example with transmission line stubs. The matching could in some cases be done on the antenna sheet.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths and widths as electrical dimensions (i.e., as a function of a used wavelength), shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communication networks. Examples of wireless communication networks comprise 5G/NR and WLAN networks. For example, an antenna element or an antenna array in accordance with at least some embodiments of the present invention suits particularly well for wireless communication networks wherein massive MIMO is used, e.g., in 5G BSs.

ACRONYMS LIST

3GPP 3rd Generation Partnership Project
5G 5$^{th}$ Generation
LTE Long Term Evolution
MIMO Multiple-Input Multiple-Output
NR New Radio
PET Polyethylene terephthalate
RAT Radio Access Technology
RF Radio Frequency
UE User Equipment
WLAN Wireless Local Area Network

REFERENCE SIGNS LIST

| | |
|---|---|
| 100 | Antenna element |
| 110, 210, 310, 410 | Antenna, e.g., dipole antenna |
| 120, 220, 320, 420 | Single flexible film |
| 130, 230, 330, 430 | Transmission line |
| 132, 332 | First part of transmission line 130 |
| 134, 334 | Second part of transmission line 130 |
| 140, 240 | Feed |
| 150 | Support element |
| 160, 260 | Parasitic element |
| 270, 470 | Base board |
| 380 | Opening |
| 400 | Antenna array |
| 490 | Spacer |

The invention claimed is:

1. An antenna element for an antenna array, comprising:

a transmission line and an antenna, wherein one end of the transmission line is coupled to a base board of the antenna array and another end of the transmission line is coupled to the antenna, and a first part of the transmission line is bent about 90 degrees compared to a second part of the transmission line, and the transmission line and the antenna are on, or in, a single flexible film, wherein the single flexible film comprises an opening and the second part of the transmission line is arranged to go through the opening, and the second part of the transmission line is arranged to go through the opening from a level of the antenna to the base board of the antenna array.

2. The antenna element according to claim 1, further comprising at least a part of a support element between the base board of the antenna array and the antenna, wherein the transmission line is bent along a side of the part of the support element.

3. The antenna element according to claim 2, wherein said single flexible film is made of plastic.

4. The antenna element according to claim 2, wherein the single flexible film is made of Polyethylene terephthalate, PET, material.

5. The antenna element according to claim 1, wherein said single flexible film is made of plastic.

6. The antenna element according to claim 1, wherein the single flexible film is made of Polyethylene terephthalate, PET, material.

7. The antenna element according to claim 1, wherein a thickness of the single flexible film is about 50 micrometers or less.

8. The antenna element according to claim 1, wherein the antenna is a dipole antenna.

9. The antenna element according to claim 1, wherein the antenna and the base board are at a distance from each other.

10. The antenna element according to claim 9, wherein the distance is comparable to a quarter of a wavelength.

11. The antenna element according to claim 1, wherein the transmission line comprises copper or silver paste.

12. The antenna element according to claim 1, wherein the antenna element further comprises a parasitic element in parallel with the antenna.

13. The antenna element according to claim 1, wherein a thickness of the single flexible film is 25 micrometers.

14. An antenna array comprising multiple antenna elements, wherein the antenna elements comprise:

a transmission line and an antenna, wherein one end of the transmission line is coupled to a base board of the antenna array and another end of the transmission line is coupled to the antenna, and a first part of the transmission line is bent about 90 degrees compared to a second part of the transmission line, and the transmission line and the antenna are on, or in, a single flexible film, wherein the single flexible film comprises an opening and the second part of the transmission line is arranged to go through the opening, and the second part of the transmission line is arranged to go through the opening from a level of the antenna to the base board of the antenna array.

15. A wireless network node comprising an antenna array, wherein the antenna array comprises multiple antenna elements, and wherein the antenna elements comprise:

a transmission line and an antenna, wherein one end of the transmission line is coupled to a base board of the antenna array and another end of the transmission line is coupled to the antenna, and a first part of the transmission line is bent about 90 degrees compared to a second part of the transmission line, and the transmission line and the antenna are on, or in, a single flexible film, wherein the single flexible film comprises an opening and the second part of the transmission line is arranged to go through the opening, and the second part of the transmission line is arranged to go through the opening from a level of the antenna to the base board of the antenna array.

16. The wireless network node according to claim 15, wherein the wireless network node is a base station configured to operate in accordance with a 3rd Generation Partnership Project, 3GPP, standard.

17. The wireless network node according to claim 16, wherein the 3GPP standard is a 5G standard.

* * * * *